(12) United States Patent
Martini

(10) Patent No.: US 8,910,263 B1
(45) Date of Patent: Dec. 9, 2014

(54) MOBILE DEVICE MANAGEMENT PROFILE DISTRIBUTION

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/029,639

(22) Filed: Sep. 17, 2013

(51) Int. Cl.
*G06F 15/16* (2006.01)
*H04L 29/06* (2006.01)

(52) U.S. Cl.
CPC .................................. *H04L 63/10* (2013.01)
USPC ..................................... 726/8; 726/4; 726/26

(58) Field of Classification Search
CPC ......... G06F 21/62; G06F 21/44; G06F 21/41; G06F 21/554; H04L 63/107; H04W 63/10; H04W 12/12
USPC .................................................... 726/8, 26, 4
See application file for complete search history.

(56) References Cited

U.S. PATENT DOCUMENTS

| | | | |
|---|---|---|---|
| 8,056,143 B2 | 11/2011 | Brown et al. | |
| 8,359,016 B2 | 1/2013 | Lindeman et al. | |
| 8,473,743 B2 | 6/2013 | Freedman et al. | |
| 8,613,070 B1 * | 12/2013 | Borzycki et al. | 726/8 |
| 2004/0098715 A1 | 5/2004 | Aghera et al. | |
| 2008/0137593 A1 * | 6/2008 | Laudermilch et al. | 370/328 |
| 2010/0112983 A1 | 5/2010 | Walker et al. | |
| 2010/0115582 A1 | 5/2010 | Sapp et al. | |
| 2010/0299719 A1 | 11/2010 | Burks et al. | |
| 2011/0167470 A1 | 7/2011 | Walker et al. | |
| 2011/0252240 A1 | 10/2011 | Freedman et al. | |
| 2011/0276683 A1 | 11/2011 | Goldschlag et al. | |
| 2012/0129503 A1 | 5/2012 | Lindeman et al. | |
| 2012/0131685 A1 * | 5/2012 | Broch et al. | 726/30 |
| 2012/0173682 A1 | 7/2012 | Mantere et al. | |
| 2012/0240183 A1 | 9/2012 | Sinha | |
| 2012/0284401 A1 | 11/2012 | Visalli et al. | |
| 2013/0007245 A1 | 1/2013 | Malik et al. | |
| 2013/0007848 A1 * | 1/2013 | Chaskar et al. | 726/4 |

(Continued)

OTHER PUBLICATIONS

Airwatch, "Bring Your Own Device (BYOD)," air-watch.corn [online], brochure created Feb. 21, 2013, [retrieved on Aug. 15, 2013]. Retrieved from the Internet: <URL: http://www.air-watch.com/downloads/brochures/AirWatch_brochure_BYOD.pdf > 2 pages.

(Continued)

*Primary Examiner* — Harunur Rashid
(74) *Attorney, Agent, or Firm* — Fish & Richardson P.C.

(57) ABSTRACT

Methods, systems, and apparatus, including computer programs encoded on computer storage media, for automated mobile device management profile distribution. One of the methods includes receiving a first request for access to a first network resource from a client device, the first network resource corresponding to one of a plurality of restricted resources accessible only by devices enrolled with a mobile device management system, determining that the client device is not enrolled with the mobile device management system, preventing the client device access to the first network resource, providing to the client device a redirect to a mobile device management resource that is different from the first network resource, providing instructions for presentation of a user interface to the client device, and enrolling the client device with the mobile device management system, the enrolling comprising providing a copy of the mobile device management profile to the client device.

27 Claims, 4 Drawing Sheets

(56) References Cited

U.S. PATENT DOCUMENTS

| | | | |
|---|---|---|---|
| 2013/0022030 A1* | 1/2013 | Hillier | 370/338 |
| 2013/0054763 A1 | 2/2013 | Van der Merwe et al. | |
| 2013/0081104 A1 | 3/2013 | Jung et al. | |
| 2013/0122867 A1 | 5/2013 | Bayliss et al. | |
| 2013/0132941 A1 | 5/2013 | Lindeman et al. | |
| 2013/0143522 A1 | 6/2013 | Rege et al. | |
| 2013/0196615 A1 | 8/2013 | Zalmanovitch et al. | |
| 2013/0227636 A1* | 8/2013 | Bettini et al. | 726/1 |
| 2013/0247144 A1 | 9/2013 | Marshall et al. | |
| 2013/0247166 A1 | 9/2013 | Freedman et al. | |
| 2013/0254837 A1* | 9/2013 | Brannon et al. | 726/1 |
| 2013/0254889 A1* | 9/2013 | Stuntebeck | 726/23 |
| 2013/0268666 A1* | 10/2013 | Wilson et al. | 709/225 |
| 2013/0297662 A1* | 11/2013 | Sharma et al. | 707/827 |
| 2013/0340031 A1* | 12/2013 | Amit et al. | 726/1 |
| 2014/0026198 A1* | 1/2014 | Isozaki et al. | 726/4 |

OTHER PUBLICATIONS

Airwatch, "Mobile Device Management (MDM)," air-watch.com [online], copyright 2013 [retrieved on Aug. 15, 2013]. Retrieved from the Internet: < URL: http://www.air-watch.com/solutions/mobile-device-management>, 6 pages.

Airwatch, "Mobile Device Management," air-watch.com [online], brochure created Feb. 21, 2013, [retrieved on Aug. 15, 2013]. Retrieved from the Internet: <URL: http://www.air-watch.com/downloads/brochures/AirWatch_brbrochu_mobile_device_management.pdf> 2 pages.

Apple, "Deploying iPhone and iPad mobile device management," 8 pages, Sep. 2012.

BoxTone, "Automated mobile device management," boxtone.com [online], copyright 2012, [retrieved on Aug. 15, 2013]. Retrieved from the Internet: < URL: http://boxtone.com/mobile-device-management.aspx>, 2 pages.

Cisco Meraki, "Cloud managed networks that simply work," meraki.cisco.com [online], [retrieved on Aug. 15, 2013]. Retrieved from the Internet: < URL: http://meraki.cisco.com/products/systems-manager>, 4 pages.

IBM, "Endpoint manager for mobile devices setup guide," created Feb. 16, 2013 [retrieved on Aug. 15, 2013]. Retrieved from the Internet: < URL: http://pic.dhe.ibm.com/infocenter/tivihelp/v26r1/topic/com.ibm.tem.doc_8.2/MDM_Setup_Guide.pdf> 32 pages.

Microsoft, "How to install clients on mobile devices and enroll them by using configuration manager," technet.microsoft.com [online], Jun. 2013 [retrieved on Aug. 15, 2013]. Retrieved from the Internet:< URL: http://technet.microsoft.com/en-us/library/gg712327.aspx> 15 pages.

'Amtel' [online]. "Mobile App Management|Secure Mobile & Enterprise Apps Store—Amtel" 2013, [retrieved from the Internet on Jul. 17, 2013]. Retrieved from the Internet: http://www.amtelnet.com/mobile-device-management/mobile-apps-management-mam/ 3 pages.

'Amtel' [online]. "Mobile Device Management MDM|Android MDM & IOS MEM—Amtel," 2013, [retrieved from the Internet on Jul. 17, 2013]. Retrieved from the Internet: http://www.amtelnet.com/mobile-device-management/, 4 pages.

'Google Apps' [online]. "Google Apps Mobile Management: Devices—Google Apps Help," 2013, [retrieved from the Internet on Jul. 17, 2013]. Retrieved from the Internet: http://support.google.com/a/bin/answer.py?hl=en&answer=1408863, 2 pages.

'Google Apps' [online]. "Google Apps Mobile Management: Org Settings—Google Apps Help," 2013, [retrieved from the Internet on Jul. 17, 2013]. Retrieved from the Internet: http://support.google.com/a/bin/answer.py?hl=en&answer=1408902, 4 pages.

'Google Play' [online]. "Google Apps Device Policy—Android Apps on Google Play," 2013, [retrieved from the Internet on Jul. 17, 2013]. Retrieved from the Internet: https://play.google.com/store/apps/details?id=com.google.android.apps.e 4 pages.

'ManageEngine' [online]. "Control USB|USB Device Management| Enable, Disable USB Devices," 2013, [retrieved from the Internet on Jul. 17, 2013]. Retrieved from the Internet: http://www.manageengine.com/desktop-management-msp/mobile-devic, 2 pages.

'Open Mobile Alliance,' [online]. "Mobile Device Management for All Devices Including iPhone & Android," 2012, [retrieved from the Internet on Jul. 17, 2013]. Retrieved from the Internet: http://openmobilealliance.org/about-oma/work-program/device-manage 5 pages.

'Zenprise' [online]. "Government Mobile Device Management," 2013, [retrieved from the Internet on Jul. 17, 2013]. Retrieved from the Internet: http://www.citrix.com/solutions/us-government/overview.html, 1 page.

\* cited by examiner

MOBILE DEVICE MANAGEMENT PROFILE DISTRIBUTION

TECHNICAL FIELD

This specification relates to systems and techniques that facilitate installation of mobile device management profiles.

BACKGROUND

Mobile device management functionality can include over the air distribution of data and software applications, and configuration of mobile device settings. Mobile device management can be used for both organization owned and employee owned devices.

The use of mobile device management by an organization can reduce risk and support costs by enforcing policies on the mobile devices that access the organizations data. For example, mobile device management profiles can enforce the use of password protection on mobile devices.

SUMMARY

In general, one aspect of the subject matter described in this specification can be embodied in methods that include the actions of receiving a first request for access to a first network resource from a client device, the first network resource corresponding to one of a plurality of restricted resources accessible only by devices enrolled with a mobile device management system, determining that the client device is not enrolled with the mobile device management system, preventing, based on determining that the client device is not enrolled with the mobile device management system, the client device access to the first network resource, providing to the client device, based on determining that the client device is not enrolled with the mobile device management system, a redirect to a mobile device management resource that is different from the first network resource, providing instructions for presentation of a user interface to the client device, the provided instructions relating to the mobile device management resource and comprising a user notification regarding a mobile device management profile, and enrolling the client device with the mobile device management system, the enrolling comprising providing a copy of the mobile device management profile to the client device. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The method may further comprise receiving a second request for access to a second network resource from the client device, the second request received prior to the first request and the second network resource corresponding to one of a plurality of unrestricted resources accessible by devices not enrolled with the mobile device management system, and allowing the client device access to the second network resource.

In some implementations, the method further comprises receiving a second request for access to a second network resource from the client device, the second network resource corresponding to one of the plurality of restricted resources, determining whether the client device is enrolled with the mobile device management system, and allowing the client device access to the second network resource based on determining that the client device is enrolled with the mobile device management system. The method may further comprise determining whether the mobile device management profile has been deactivated on the client device, and un-enrolling the client device from the mobile device management system based on determining that the mobile device management profile has been removed from the client device, the un-enrolling preventing the client device from accessing the plurality of restricted resources. The plurality of restricted resources may comprise resources managed by an organization that uses the mobile device management system. The plurality of restricted resources may comprise public network resources.

In some implementations, determining that the client device is not enrolled with the mobile device management system may comprise determining whether a heartbeat signal has been received within a predetermined period of time, and determining that the client device is not enrolled with the mobile device management system based on determining that the heartbeat signal has not been received within the predetermined period of time. Determining that the client device is not enrolled with the mobile device management system may comprise determining whether a device identifier associated with the client device is categorized as being enrolled with the mobile device management system, and determining that the client device is not enrolled with the mobile device management system based on determining that the device identifier associated with the client device is not categorized as being enrolled with the mobile device management system.

In some implementations, determining that the client device is not enrolled with the mobile device management system comprises determining whether one or more network settings of the client device indicate that the client device is enrolled with the mobile device management system, and determining that the client device is not enrolled with the mobile device management system is based on determining that one or more network settings of the client device indicate that the client device is not enrolled with the mobile device management system. The network settings may comprise a proxy server setting. Determining whether the one or more network settings of the client device indicate that the client device is enrolled with the mobile device management system may comprise determining whether the first request to access the first resource was received by a predetermined proxy server. Determining that one or more network settings of the client device indicate that the client device is not enrolled with the mobile device management system may comprise determining that the first request to access the first resource was not received by the predetermined proxy server. The network settings may comprise a network connection setting. Determining whether the one or more network settings of the client device indicate that the client device is enrolled with the mobile device management system may comprise determining whether the client device is connected to a non-compliant network, the non-compliant network providing access to the plurality of unrestricted resources and not providing access to any of the plurality of restricted resources. Determining that one or more network settings of the client device indicate that the client device is not enrolled with the mobile device management system comprises determining that the client device is connected to a non-compliant network.

In some implementations, the instructions comprise instructions for presentation of an agreement to enroll the client device with the mobile device management system, and enrolling the client device with the mobile device management system comprises receiving input from the client device indicating acceptance of the agreement, wherein the client device is enrolled with the mobile device management system in response to receiving the input from the client device. The instructions may comprise information about access to the first network resource.

The subject matter described in this specification may be implemented in various implementations to realize one or more of the following potential advantages. In some implementations, a determination of whether a client device is enrolled with a mobile device management system and distribution of a mobile device management profile to the client device automates the enrollment of the client device with the mobile device management system. In some implementations, automated mobile device management enrollment facilitates the installation of a mobile device management profile on a client device without a manual navigation of the client device to a resource associated with the profile and without an administrator manually installing the profile on the client device.

Details of one or more implementations are set forth in the accompanying drawings and the description below. Other features, aspects, and potential advantages will become apparent from the description, the drawings, and the claims.

BRIEF DESCRIPTION OF THE DRAWINGS

FIG. 1 is an example of a network system configured to

FIG. 2 is a block diagram of an environment in which

FIG. 3 is a flow diagram of a process for

Like reference numbers and designations in the various drawings indicate like elements.

DETAILED DESCRIPTION

Some employees bring their own device with them to work to gain access to the resources of the organization for which the employee works. The resources may include both restricted resources, such as confidential documents, and unrestricted resources, such as public documents.

Some organizations require that employees have a mobile device management profile installed on their personal devices before the organizations allow the devices access to resources, e.g., the restricted resources. For example, an organization's network may prevent a device from accessing restricted network resources, while the device uses the organization's network, until a copy of a mobile device management profile is installed on the device. Once the mobile device management profile is installed, the device will gain access to the previously restricted resources.

To facilitate installation of the mobile device management profile on an employee's device, the organization's network determines whether the mobile device management profile is installed on the device when the device connects to the network. If the network determines that the profile is installed on the device, the network allows the device to access any resources available to an operator of the device, e.g., based on permissions of the operator. If, however, the network determines that the profile is not installed on the device, the network directs the device to present a page associated with the mobile device management profile to allow the operator of the device to request that a copy of the profile be installed on the device.

Figure 1:
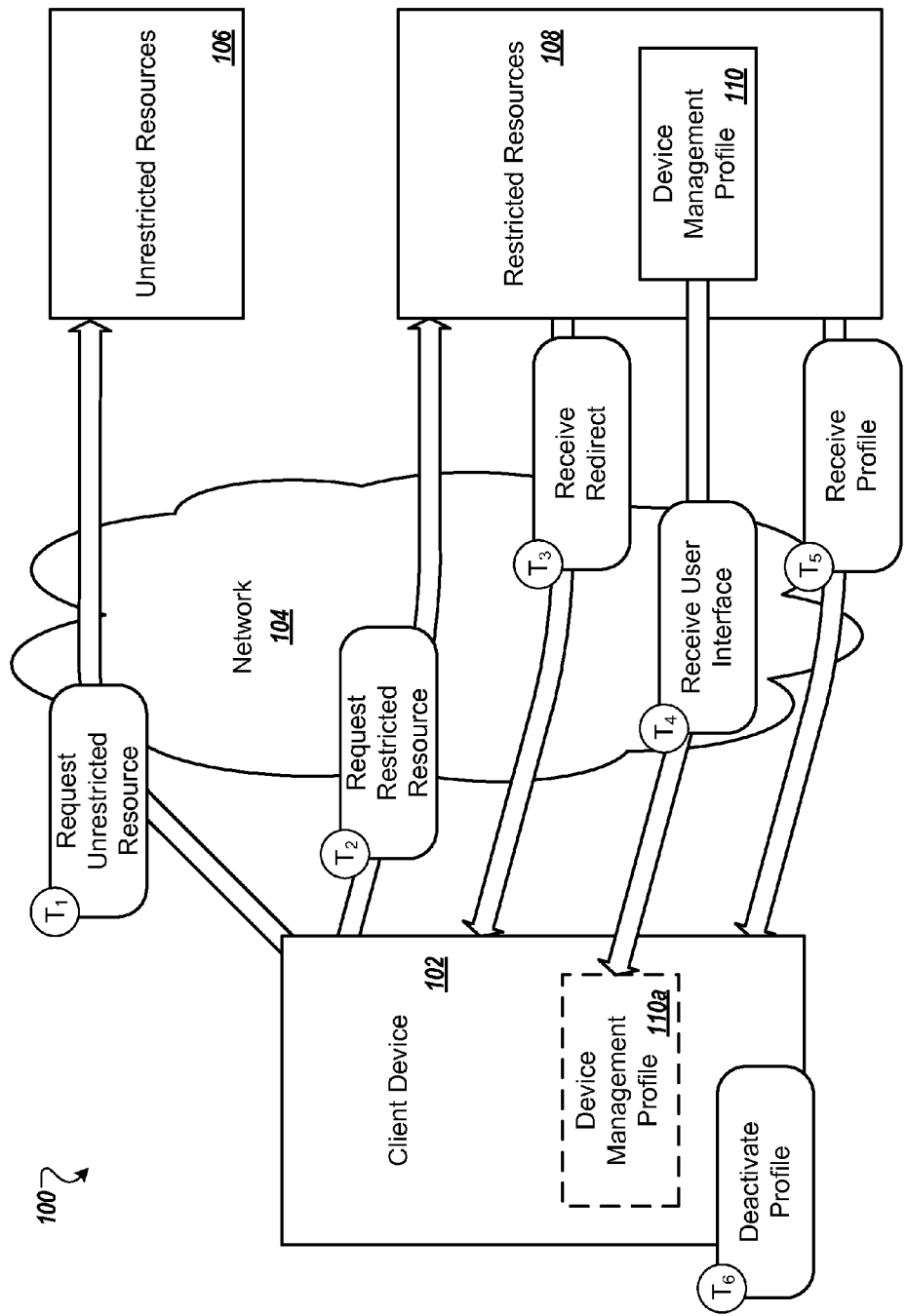

FIG. 1 is an example of a network system 100 configured to provide a client device 102 with a redirect to a device management resource. When the client device 102 does not have a device management profile installed and requests access to a restricted resource, the network system 100 prevents the client device 102 from accessing the restricted resource. The network system 100 redirects the client device 102 to the device management resource, e.g., a web page, that includes information about the device management profile to allow an operator of the client device 102 to request that the device management profile be installed on the client device 102 so that the client device 102 will receive access to the restricted resource.

At time $T_1$, the client device 102 accesses a network 104 of the network system 100 and requests access to one of a plurality of unrestricted resources 106. For example, the client device 102 requests access to a web page hosted by the network system 100 that contains information about the organization that manages the network system 100. In some examples, an operator of the client device 102 uses the client device 102 to request information about the company for which the operator works.

The network system 100 allows the client device 102 to receive a copy of the requested unrestricted resource. For example, the network system 100 provides the client device 102 with a copy of the requested web page.

The client device 102, at time $T_2$, requests access to one of a plurality of restricted resources 108. For example, the client device 102 requests access to a confidential document of the organization that employs the operator of the client device 102. In some examples, when the client device 102 requests access to an Internet resource, the network system 100 determines that the requested Internet resource is one of the restricted resources 108 and prevents the client device 102 from accessing the Internet resource. For example, the restricted resources 108 may include all Internet resources, e.g., Internet web pages, or a subset of Internet resources.

The network system 100 provides the client device 102 with a redirect for a device management resource different from the requested restricted resource at time $T_3$. For example, the client device 102 receives the redirect and requests the device management resource from the network system 100. The device management resource may include instructions for the presentation of a user interface on the client device 102 where presentation of the user interface informs the operator of the client device 102 that the client device 102 must be enrolled with the network system 100 before the client device 102 can access the requested restricted resource.

The client device 102 receives, at time $T_4$, the user interface instructions and presents the user interface to the operator of the client device 102. The operator of the client device 102 interacts with the user interface, e.g., by selecting a "proceed with enrollment" option, and the client device requests a device management profile 110 from the network system 100.

At time $T_5$, the client device 102 receives a copy of the device management profile 110a and installs the copy of the device management profile 110a in a memory of the client device 102. The installation of the copy of the device management profile 110a, for example, configures one or more settings of the client device 102 to allow the client device 102 to access the restricted resources 108. For example, the device management profile 110a configures one or more network settings, such as a proxy setting or a wireless network setting, of the client device 102 to allow the client device to access some of the restricted resources 108, e.g., based on permissions of the operator of the client device 102.

In some implementations, the installation of the copy of the device management profile 110a on the client device 102 applies one or more restrictions on the client device 102. For example, the device management profile 110a may prevent the installation of potentially unsafe applications on the client device 102 and/or may remove any potentially unsafe applications from the client device 102 after the device management profile 110a is initially installed.

In some implementations, an operator of the client device 102 may deactivate the device management profile 110a at time $T_6$. For example, the operator may disable or uninstall the device management profile 110a. Deactivation of the device management profile 110a may allow the operator of the client device 102 to install any application on the client device 102, whether or not an application is identified as potentially unsafe, but prevents the client device 102 from accessing any of the restricted resources 108. For example, when the client device 102 requests access to one of the restricted resources 108 after time $T_6$, the network system 100 determines that the device management profile 110a has been deactivated and prevents the client device 102 from accessing the requested restricted resource. When the operator of the client device 102 deactivates the device management profile 110a, all payloads, settings, and/or policies that were distributed to the client device 102 during installation of the device management profile 110a are removed from the client device 102.

In some implementations, the unrestricted resources 106 only include the device management resource. For example, when the client device 102 does not have the device management profile 110a installed, the network system 100 prevents the client device 102 from accessing any network resources, e.g., resources of the organization managing the network system 100 and Internet resources, except for the device management resource. When the client device 102 requests access to any resource, except the device management resource, the network system 100 provides the client device 102 with the redirect for the device management resource and does not allow the client device 102 to access the requested resource until the copy of the device management profile 110a is installed on the client device 102.

The client device 102 may include personal computers, mobile communication devices, and other devices that can send and receive data over the network 104. The network 104, such as a local area network (LAN), wide area network (WAN), the Internet, or a combination thereof, connects the client device 102, the unrestricted resources 106, and the restricted resources 108. Some examples of resources, restricted and/or unrestricted, include web pages, network printers, file servers, and scanners.

In some implementations, the time periods $T_1$, $T_2$, $T_3$, $T_4$, $T_5$, and $T_6$ can overlap. For example, operations performed in time period $T_1$, can be performed in parallel with operations performed in time period $T_2$. The client device 102 could, for example, request the unrestricted resource during time $T_1$ and then request the restricted resource during time $T_2$ while waiting to receive the unrestricted resource. In some examples, the client device 102 may receive the redirect and request the mobile device management resource during time $T_3$, and then request an unrestricted resource during time $T_1$. Further, the client device 102 may continue to request and/or receive unrestricted resources while receiving the user interface during time $T_4$ and receiving the mobile device management profile during time $T_5$. In some examples, the client device 102 may request an unrestricted resource during time $T_1$ after deactivating the device management profile 110a during time $T_6$.

Figure 2:
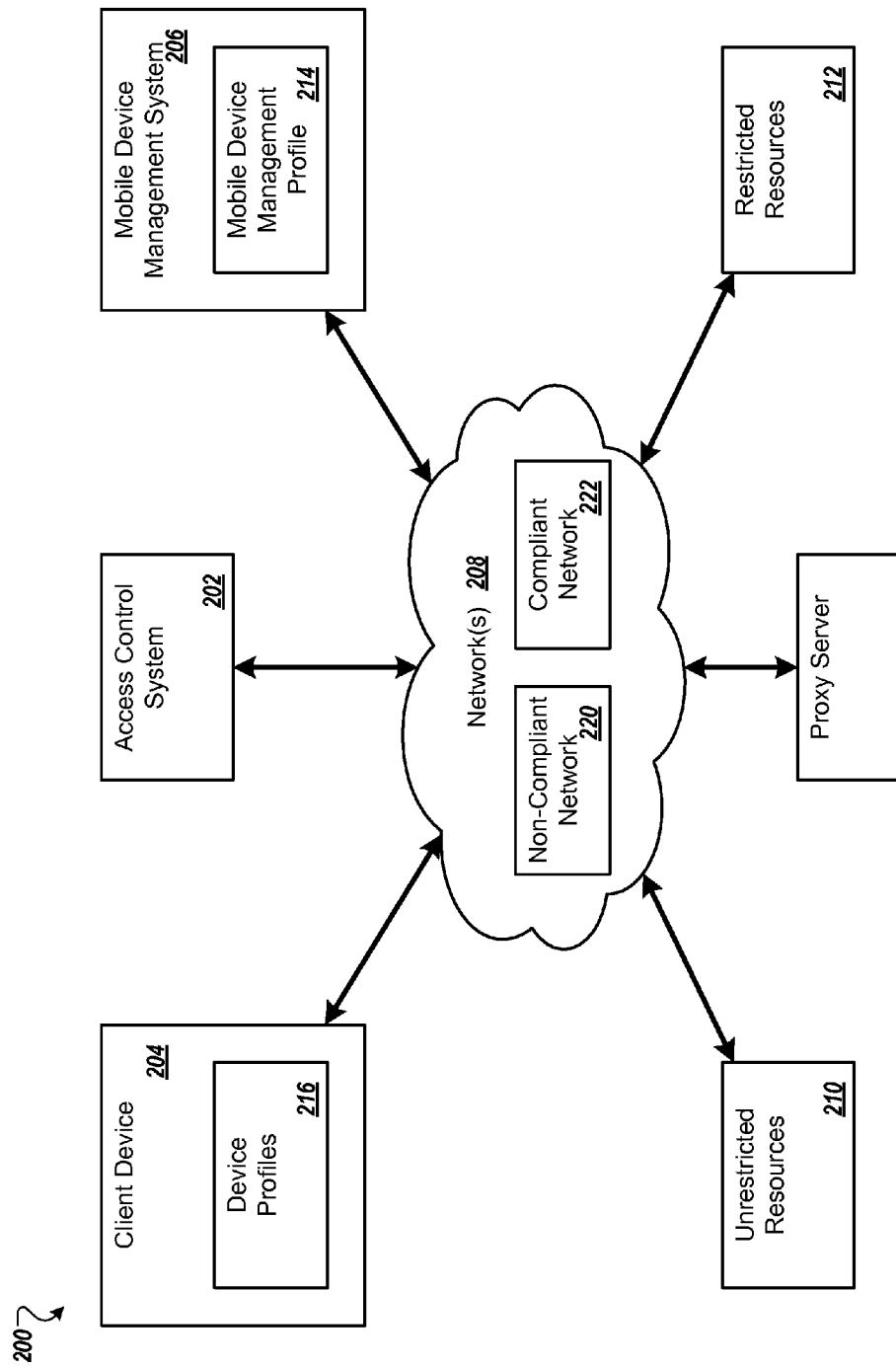

FIG. 2 is a block diagram of an environment 200 in which an access control system 202 determines whether a client device 204 is enrolled with a mobile device management system 206. When the client device 204 first connects to a network 208 and requests a resource, such as one of a plurality of unrestricted resources 210 or one of a plurality of restricted resources 212, the access control system 202 determines whether the client device 204 is enrolled with the mobile device management system 206 and prevents or allows access to the requested resource accordingly.

For example, when the client device 204 requests access to one of the unrestricted resources 210, such as a home page for the organization that manages the network 208, the access control system 202 allows the client device 204 to access the requested unrestricted resource.

If, however, the client device 204 requests access to one of the restricted resources 212, such as a patient's medical record or another confidential document of the organization, the access control system 202 determines whether the client device 204 is enrolled with the mobile device management system 206 and prevents or allows access to the requested restricted resource accordingly. For example, if the client device 204 is not currently enrolled with the mobile device management system 206, then the access control system 202 prevents the client device 204 from accessing the requested restricted resource.

In some examples, the access control system 202 provides the client device 204 with a redirect, such as a hypertext transfer protocol (HTTP) redirect, for a mobile device management resource different from the requested restricted resource. For example, the mobile device management resource may be one of the unrestricted resources 210.

Upon accessing the mobile device management resource, the client device 204 may receive instructions for receiving a mobile device management profile 214 from the mobile device management system 206 and installing a copy of the mobile device management profile 214 as one of a plurality of device profiles 216 of the client device 204. The mobile device management profile 214 may configure one or more settings of the client device 204 and/or of the other device profiles 216 to allow the client device 204 to access the restricted resources 212.

In some implementations, the mobile device management profile 214 configures one or more network settings of the client device 204 to indicate that the client device 204 is enrolled with the mobile device management system 206. For example, the mobile device management profile 214 may configure a proxy setting so that the client device 204 sends resource requests to a proxy server 218 in the environment 200. The access control system 202 may then determine whether a request from the client device 204 to access one of the restricted resources 212 was received by the proxy server 218 as an indication of whether the client device 204 is enrolled with the mobile device management system 206.

If the request for the restricted resource is received by the proxy server 218, the access control system 202 determines that the client device 204 is enrolled with the mobile device management system 206, has a copy of the mobile device management profile 214 installed in a memory, and should be allowed to access the requested restricted resource. If, however, the access control system 202 determines that the request was not received by the proxy server 218, the access control system 202 determines that the client device 204 is not enrolled with the mobile device management system 206 and prevents the client device 204 from accessing the requested restricted resource.

In some implementations, when the network settings include a network connection setting, the access control system 202 determines whether the client device 204 is enrolled with the mobile device management system 206 based on the network with which the client device 204 connects. For example, the access control system 202 may determine whether the client device 204 is connected to a non-compliant network 220 or a compliant network 222 and prevent or allow, respectively, access to the restricted resources 212. For example, when the client device 204 enrolls with the mobile device management system 206, the mobile device management profile 214 may configure one or more settings for access to a compliant wireless network such that, upon determining that the client device 204 is connected to the compliant wireless network, the access control system 202 allows the client device 204 access to a restricted resource. If the access control system 202 determines that the client device 204 is connected to a non-compliant wireless network, the access control system 202 prevents the client device 204 from accessing any of the restricted resources 212 and allows the client device 204 to access the unrestricted resources 210.

In some implementations, the non-compliant network 220 and the compliant network 222 are part of the same network. For example, when the client device 204 connects to the network 208 and is not enrolled with the mobile device management system 206, the client device 204 may be assigned a first internet protocol address from a first range of internet protocol addresses associated with the non-compliant network 220. When the client device 204 enrolls with the mobile device management system 206, the client device 204 is assigned a second internet protocol address from a second range of internet protocol addresses associated with the compliant network 222. In these implementations, the access control system 202 determines whether the client device 204 is enrolled with the mobile device management system 206 based on the current internet protocol address assigned to the client device 204.

In some implementations, the non-compliant network 220 is an unsecured network and the compliant network 222 is a secured network. For example, data transferred across the compliant network 222 may be encrypted.

In some implementations, when the mobile device management profile is deactivated on the client device 204, the environment 200 automatically removes the access of the client device 204 to the restricted resources 212 at substantially the same time that the mobile device management profile is deactivated. For example, when the mobile device management profile configures the access of the client device 204 to the compliant network 222, e.g., a compliant wireless network, and the mobile device management profile on the client device 204 is deactivated, the credentials that allow the client device 204 to connect to the compliant network 222 are removed and the client device 204 connects to the non-compliant network 220, e.g., based on the settings of the client device 204, and is unable to access the restricted resources 212.

In some implementations, when the mobile device management profile on the client device 204 is deactivated, the proxy settings for the proxy server 218 are removed from the client device 204. For example, when the access control system 202 determines that the client device 204 is enrolled with the mobile device management system 206 based on whether a resource request from the client device 204 was received by the proxy server 218 and an operator of the client device 204 deactivates, e.g., disables or uninstalls, the copy of the mobile device management profile on the client device 204, the proxy settings for the proxy server 218 are automatically removed from the client device 204 so that later resource requests made by the client device 204 are not sent to the proxy server 218. This may allow the access control system 202 to determine at substantially the same time the mobile device management profile is deactivated on the client device 204, that the client device 204 is no longer enrolled with the mobile device management system 206.

In some implementations, the mobile device management profile 214 configures the client device 204 to send a heartbeat signal to the mobile device management system 206 while the mobile device management profile 214 is installed and enabled on the client device 204. For example, upon installation of the mobile device management profile 214, the client device 204 periodically sends a signal to the mobile device management system 206 where the signal indicates that the client device 204 has the mobile device management profile 214 installed and that the client device 204 is enrolled with the mobile device management system 206.

When an operator of the client device 204 disables or uninstalls the mobile device management profile 214 from the client device 204, the client device 204 no longer sends the heartbeat signal to the mobile device management system 206, indicating that the client device 204 is no longer enrolled with the mobile device management system 206. In these implementations, the access control system 202 determines whether the client device 204 is enrolled with the mobile device management system 206 based on the receipt of the heartbeat signal by the mobile device management system 206 from the client device 204. For example, the heartbeat signal may include an identifier of the client device 204.

In some implementations, the mobile device management system 206 records a device identifier of the client device 204 when the client device 204 enrolls with the mobile device management system 206. For example, the mobile device management system 206 stores a media access control address of the client device 204 when the mobile device management profile 214 is installed on the client device 204 to indicate that the client device 204 is enrolled with the mobile device management system 206. When the mobile device management profile 214 is deactivated on the client device 204, the mobile device management system 206 may receive a message from the client device 204 indicating the deactivation of the mobile device management profile 214 and update data associated with the client device's 204 media access control address to indicate that the client device 204 is no longer enrolled with the mobile device management system 206.

In some examples, the access control system 202 and/or the mobile device management system 206 determine whether the client device 204 is enrolled with the mobile device management system 206 based on a record in a memory of the mobile device management system 206, e.g., a database record. For example, the record may indicate whether or not the client device 204 is enrolled with the mobile device management system 206, e.g., where the record includes an identifier of the client device 204.

The access control system 202 and/or the mobile device management system 206 may use any appropriate algorithm to determine whether the client device 204 is enrolled with the mobile device management system 206 and to monitor the enrollment of the client device 204 with the mobile device management system 206.

In some implementations, the access control system 202 and the mobile device management system 206 are part of the same system. For example, a single server may include the access control system 202 and the mobile device management system 206.

In some implementations, the proxy server 218 is part of the same system as the access control system 202 and/or the mobile device management system 206. For example, the same server may host the access control system 202 and the proxy server 218.

The client device 204 may include personal computers, mobile communication devices, and other devices that can send and receive data over the network 208. The network 208, such as a local area network (LAN), wide area network (WAN), the Internet, or a combination thereof, connects the access control system 202, the client device 204, the mobile device management system 206, the unrestricted resources 210, the restricted resources 212, and the proxy server 218.

Figure 3:
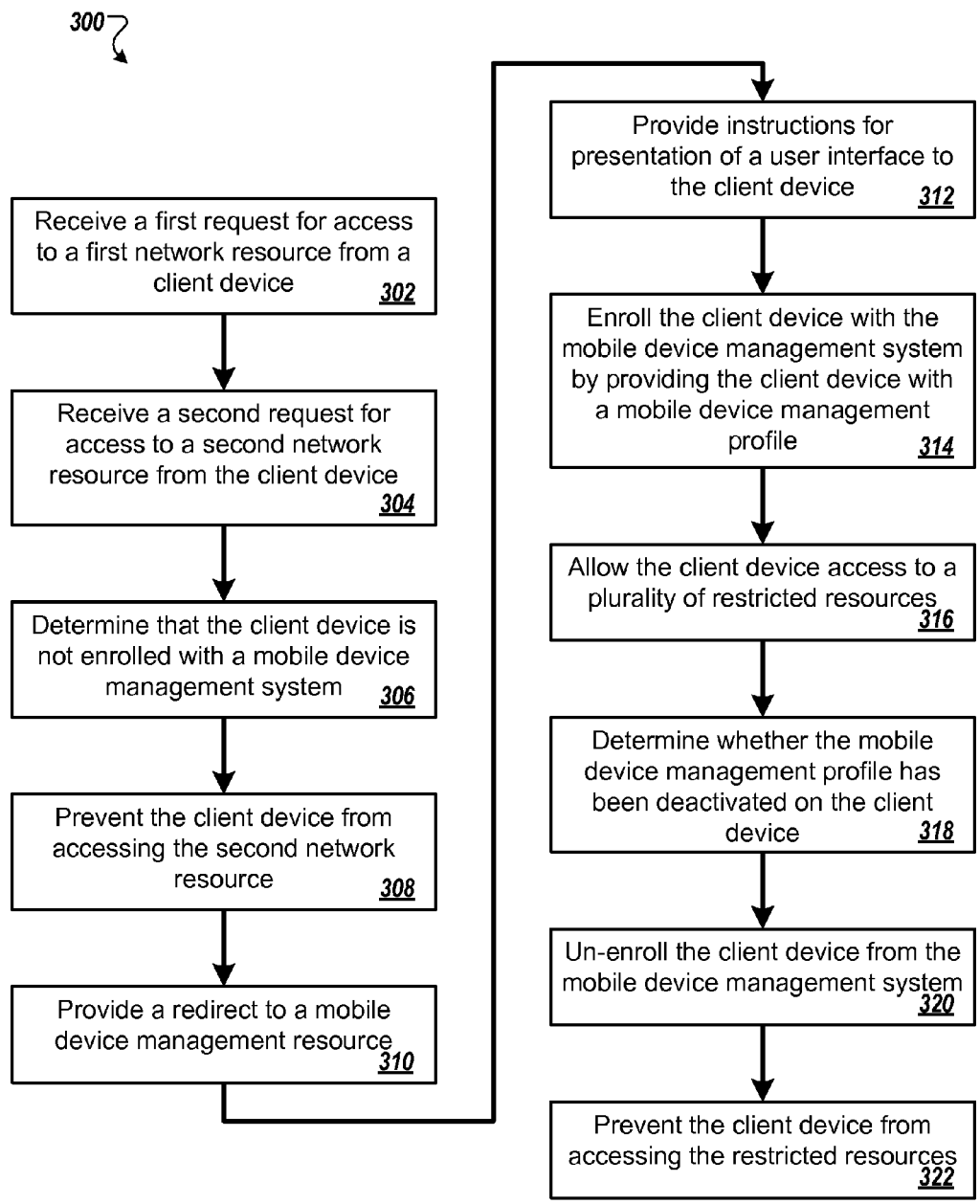

FIG. 3 is a flow diagram of a process 300 for providing a client device with a mobile device management profile. For example, the process 300 can be used by the access control system 202 from the environment 200. In some implementations, one or more steps of the process 300 may be performed by another component of the environment 200, such as the mobile device management system 206.

The process receives a first request for access to a first network resource from a client device (302). The first network resource corresponds to one of a plurality of unrestricted resources accessible by devices not enrolled with a mobile device management system. For example, the access control system receives a copy of a request for an unrestricted resource from the client device.

The access control system allows the client device access to the first network resource. For example, the access control system does not block the client device's access to the requested unrestricted resource. The access control system may use any appropriate algorithm to allow and/or block access to unrestricted and restricted resources.

The process receives a second request for access to a second network resource from the client device (304). The second network resource corresponds to one of a plurality of restricted resources accessible only by devices enrolled with the mobile device management system. For example, the access control system receives a request for a restricted resource, such as a confidential document, an internal organization file, or a web page, from the client device.

In some implementations, the plurality of restricted resources comprises resources managed by an organization that uses the mobile device management system and/or the access control system. Some examples of restricted resources managed by an organization include confidential documents, patient files, internal memoranda, intranet web pages, accounting files, internal educational files, human resource files, organization printers, and organization scanners, among other types of resources managed by the organization.

In some implementations, the plurality of restricted resources comprises public network resources. For example, the public network resources may include one or more Internet resources. Some examples of restricted public network resources include public web pages, file transfer protocol files, instant messaging resources, and chat room resources, among other types of network resources.

The process determines that the client device is not enrolled with the mobile device management system (306). For example, the access control system or the mobile device management system determine that the client device is not sending a heartbeat signal to the mobile device management system, that an identifier of the client device does not indicate that the client device is enrolled with the mobile device management system, and/or that one or more network settings, such as a proxy server setting or a network connection setting, do not indicate that the client device is enrolled with the mobile device management system.

The process prevents the client device from accessing the second network resource (308). For example, the access control system prevents the client device from accessing the second network resource based on determining that the client device is not enrolled with the mobile device management system.

The process provides a redirect to a mobile device management resource (310). For example, the access control system provides the client device with the redirect to the mobile device management resource, different from the first network resource and the second network resource, based on determining that the client device is not enrolled with the mobile device management system.

The process provides instructions for presentation of a user interface to the client device (312). The provided instructions relate to the mobile device management resource and comprise a user notification regarding a mobile device management profile. For example, the client device receives the redirect for the mobile device management resource and the access control system or the mobile device management system, in response to the client device's request for the mobile device management resource, provides the instructions to the client device.

In some implementations, the user interface includes a request for credentials from an operator of the client device. For example, the user interface includes user interface elements that request a username and password for the operator of the client device.

In some implementations, the instructions include instructions for presentation of an agreement to enroll the client device with the mobile device management system. For example, the agreement indicates that a mobile device management profile will be installed on the client device and any restrictions associated with the installation of the mobile device management profile.

In some implementations, the instructions comprise information about access to the second network resource. For example, the instructions may indicate that the client device will be redirected to the second network resource after the mobile device management profile is installed on the client device or that the client device will have access to the second network resource after the mobile device management profile is installed on the client device.

The process enrolls the client device with the mobile device management system by providing the client device with a mobile device management profile (314). For example, the mobile device management system provides the client device with a copy of the mobile device management profile and, upon installation of the copy of the mobile device management profile on the client device, the mobile device management system may store a record in memory, e.g., in a database, indicating that the client device is enrolled with the mobile device management system.

In some implementations, upon installation on the client device, the mobile device management profile sends a message to the mobile device management system indicating that installation was successful. For example, when the mobile device management system only stores a record with an identifier of the client device to indicate that the client device is enrolled with the mobile device management system and the mobile device management profile does not adjust a network setting on the client device or send a heartbeat signal to the mobile device management system, the mobile device management system does not create the record until the mobile device management system receives an installation successful message from the mobile device management profile.

In some implementations, enrolling the client device with the mobile device management system includes receiving input from the client device indicating acceptance of the agreement, wherein the client device is enrolled with the mobile device management system in response to receiving the input from the client device. For example, the mobile device management system does not provide the mobile device management profile to the client device or enroll the client device, e.g., allow the client device to access restricted resources, if an operator of the client device does not accept the agreement.

The process allows the client device access to a plurality of restricted resources (316). For example, the access control system receives a third request for access to a third network resource from the client device, the third network resource corresponding to one of the plurality of restricted resources, and determines whether the client device is enrolled with the mobile device management system. The access control system allows the client device access to the third network resource based on determining that the client device is enrolled with the mobile device management system.

In some implementations, the third network resource is the same resource as the second network resource. For example, after enrolling with the mobile device management system, the client device may request the second network resource and the access control system, after receiving the request, would allow the client device to access the second network resource.

In some implementations, the third network resource is a different resource from the second network resource. For example, after enrolling with the mobile device management system, the client device may request access to the third network resource.

The process determines whether the mobile device management profile has been deactivated on the client device (318). For example, the access control system or the mobile device management system determines whether the mobile device management profile has been disabled or uninstalled on the client device. In some examples, an operator of the client device may disable the device management profile in order to install an application that the mobile device management profile prevented from being installed.

The process un-enrolls the client device from the mobile device management system (320). For example, the mobile device management system determines that the client device is no longer sending the heartbeat signal to the mobile device management system and un-enrolls the client device from the mobile device management system. In some examples, the mobile device management system receives a message from the client device that indicates that the mobile device management profile has been deactivated. In some implementations, when the mobile device management profile is deactivated, one or more network settings, such as a network connection setting or a proxy server setting, on the client device are restored to an original value and the network to which the client device connects indicates that the client device is or should be un-enrolled from the mobile device management system.

The process prevents the client device from accessing the restricted resources (322). For example, upon determining that the client device is no longer enrolled with the mobile device management system, the access control system prevents the client from accessing any of the restricted resources.

The order of steps in the process 300 described above is illustrative only, and providing the client device with the mobile device management profile can be performed in different orders. For example, the access control system may determine whether the client device is enrolled with the mobile device management system, e.g., perform step 306, when the client device first connects to the network and then receive the second request for access to the second network resource, e.g., perform step 304.

In some implementations, the process 300 can include additional steps, fewer steps, or some of the steps can be divided into multiple steps. For example, the access control system may provide the client device with the redirect when the client device connects to the network and upon determining that the client device is not enrolled with the mobile device management system, e.g., without receiving the second request for access to the second network resource. For example, the access control system may perform steps 306 and 310 without performing steps 304 and 308.

In some implementations, the access control system prevents the client device from accessing the restricted resources, e.g., performs step 322, without un-enrolling the client device, e.g., performing step 320. For example, if the client device previously un-enrolled from the mobile device management system, the access control system may determine that the client device is not enrolled, e.g., perform step 318, and prevent the client device from accessing the restricted resources, e.g., perform step 322.

In some implementations, the process 300 includes steps 304 through 314 and does not include the other steps in the process, e.g., steps 302 and 316 through 322. For example, the access control system may receive the request for the restricted resource and later enroll the client device with the mobile device management system without receiving a request for an unrestricted resource, without allowing the client device to access one or more restricted resources, and without determining whether the mobile device management profile has been deactivate.

Figure 4:
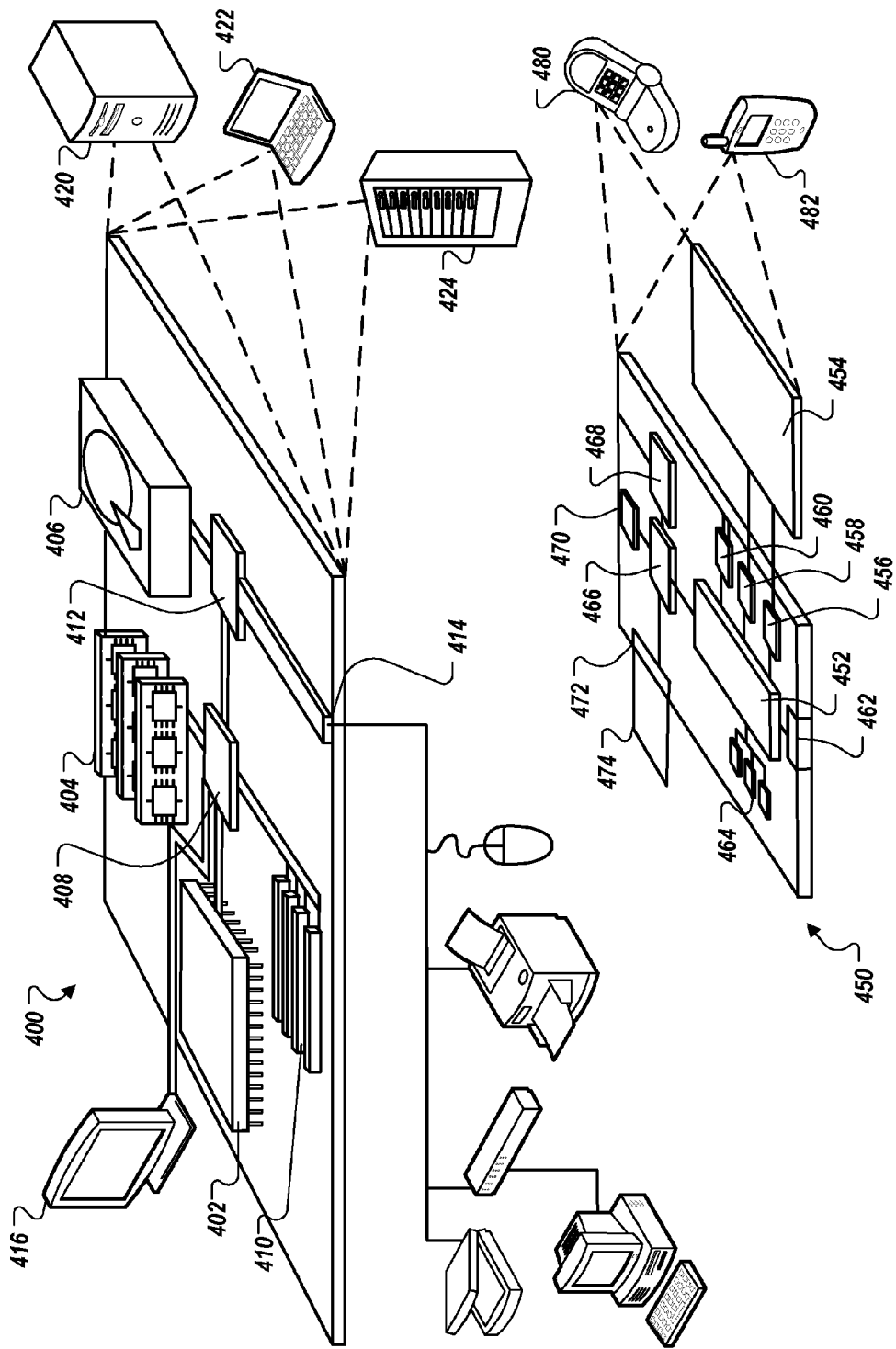
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high speed controller 408 is coupled to memory 404, display 416 (e.g., through a graphics processor or accelerator), and to high speed expansion ports 410, which may accept various expansion cards (not shown). In the implementation, low speed controller 412 is coupled to storage device 406 and low speed expansion port 414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
receiving a first request for access to a first network resource from a client device, the first network resource corresponding to one of a plurality of restricted resources accessible only by devices enrolled with a mobile device management system;
determining whether the first request to access the first resource includes an address of a predetermined proxy server;
determining that the first request to access the first resource does not include the address of the predetermined proxy server;
determining that the client device is not enrolled with the mobile device management system based on determining that the first request to access the first resource does not include the address of the predetermined proxy server;
preventing, based on determining that the client device is not enrolled with the mobile device management system, the client device access to the first network resource;
providing to the client device, based on determining that the client device is not enrolled with the mobile device management system, a redirect to a mobile device management resource that is different from the first network resource;
providing instructions for presentation of a user interface to the client device, the provided instructions relating to the mobile device management resource and comprising a user notification regarding a mobile device management profile;

enrolling the client device with the mobile device management system, the enrolling comprising providing a copy of the mobile device management profile to the client device;

receiving a second request for access to a second network resource from the client device, the second network resource corresponding to one of the plurality of restricted resource;

allowing the client device access to the second network resource based on determining that the client device is enrolled with the mobile device management system;

determining whether the mobile device management profile has been deactivated on the client device; and un-enrolling the client device from the mobile device management system based on determining that the mobile device management profile has been deactivated on the client device, the un-enrolling preventing the client device from accessing the plurality of restricted resources.

2. The method of claim 1, wherein the second request is received prior to the first request and the second network resource corresponds to one of a plurality of unrestricted resources accessible by devices not enrolled with the mobile device management system; the method further comprising:

allowing the client device access to the second network resource.

3. The method of claim 1, wherein the plurality of restricted resources comprises resources managed by an organization that uses the mobile device management system.

4. The method of claim 1, wherein the plurality of restricted resources comprises public network resources.

5. The method of claim 1, wherein determining that the client device is not enrolled with the mobile device management system comprises:

determining whether a heartbeat signal has been received within a predetermined period of time; and determining that the client device is not enrolled with the mobile device management system based on determining that the heartbeat signal has not been received within the predetermined period of time.

6. The method of claim 1, wherein determining that the client device is not enrolled with the mobile device management system comprises:

determining whether the client device is connected to a non-compliant network, the non-compliant network providing access to the plurality of unrestricted resources and not providing access to any of the plurality of restricted resources; and determining that the client device is not enrolled with the mobile device management system based on determining that the client device is connected to a non-compliant network.

7. The method of claim 1, wherein determining that the client device is not enrolled with the mobile device management system comprises:

determining whether a device identifier associated with the client device is categorized as being enrolled with the mobile device management system; and determining that the client device is not enrolled with the mobile device management system based on determining that the device identifier associated with the client device is not categorized as being enrolled with the mobile device management system.

8. The method of claim 1, wherein:

the instructions comprise instructions for presentation of an agreement to enroll the client device with the mobile device management system; and enrolling the client device with the mobile device management system comprises receiving input from the client device indicating acceptance of the agreement, wherein the client device is enrolled with the mobile device management system in response to receiving the input from the client device.

9. The method of claim 1, wherein determining whether the mobile device management profile has been deactivated on the client device comprises determining whether the mobile device management profile has been removed from the client device.

10. A non-transitory computer storage medium encoded with instructions that, when executed by one or more computers, cause the one or more computers to perform operations comprising:

receiving a first request for access to a first network resource from a client device, the first network resource corresponding to one of a plurality of restricted resources accessible only by devices enrolled with a mobile device management system;

determining whether the first request to access the first resource includes an address of a predetermined proxy server;

determining that the first request to access the first resource does not include the address of the predetermined proxy server;

determining that the client device is not enrolled with the mobile device management system based on determining that the first request to access the first resource does not include the address of the predetermined proxy server;

preventing, based on determining that the client device is not enrolled with the mobile device management system, the client device access to the first network resource;

providing to the client device, based on determining that the client device is not enrolled with the mobile device management system, a redirect to a mobile device management resource that is different from the first network resource;

providing instructions for presentation of a user interface to the client device, the provided instructions relating to the mobile device management resource and comprising a user notification regarding a mobile device management profile;

enrolling the client device with the mobile device management system, the enrolling comprising providing a copy of the mobile device management profile to the client device;

receiving a second request for access to a second network resource from the client device, the second network resource corresponding to one of the plurality of restricted resources;

allowing the client device access to the second network resource based on determining that the client device is enrolled with the mobile device management system;

determining whether the mobile device management profile has been deactivated on the client device; and un-enrolling the client device from the mobile device management system based on determining that the mobile device management profile has been deactivated on the client device, the un-enrolling preventing the client device from accessing the plurality of restricted resources.

11. The computer storage medium of claim 10, wherein the second request is received prior to the first request and the second network resource corresponds to one of a plurality of unrestricted resources accessible by devices not enrolled with the mobile device management system; the method further comprising:
   allowing the client device access to the second network resource.

12. The computer storage medium of claim 10, wherein the plurality of restricted resources comprises resources managed by an organization that uses the mobile device management system.

13. The computer storage medium of claim 10, wherein the plurality of restricted resources comprises public network resources.

14. The computer storage medium of claim 10, wherein determining that the client device is not enrolled with the mobile device management system comprises:
   determining whether a heartbeat signal has been received within a predetermined period of time; and
   determining that the client device is not enrolled with the mobile device management system based on determining that the heartbeat signal has not been received within the predetermined period of time.

15. The computer storage medium of claim 10, wherein determining that the client device is not enrolled with the mobile device management system comprises:
   determining whether the client device is connected to a non-compliant network, the non-compliant network providing access to the plurality of unrestricted resources and not providing access to any of the plurality of restricted resources; and
   determining that the client device is not enrolled with the mobile device management system based on determining that the client device is connected to a non-compliant network.

16. The computer storage medium of claim 10, wherein determining that the client device is not enrolled with the mobile device management system comprises:
   determining whether a device identifier associated with the client device is categorized as being enrolled with the mobile device management system; and
   determining that the client device is not enrolled with the mobile device management system based on determining that the device identifier associated with the client device is not categorized as being enrolled with the mobile device management system.

17. The computer storage medium of claim 10, wherein:
   the instructions comprise instructions for presentation of an agreement to enroll the client device with the mobile device management system; and
   enrolling the client device with the mobile device management system comprises receiving input from the client device indicating acceptance of the agreement, wherein the client device is enrolled with the mobile device management system in response to receiving the input from the client device.

18. The computer storage medium of claim 10, wherein determining whether the mobile device management profile has been deactivated on the client device comprises determining whether the mobile device management profile has been removed from the client device.

19. A system comprising:
   one or more computers and one or more storage devices storing instructions that are operable, when executed by the one or more computers, to cause the one or more computers to perform operations comprising:
   receiving a first request for access to a first network resource from a client device, the first network resource corresponding to one of a plurality of restricted resources accessible only by devices enrolled with a mobile device management system;
   determining whether the first request to access the first resource includes an address of a predetermined proxy server;
   determining that the first request to access the first resource does not include the address of the predetermined proxy server;
   determining that the client device is not enrolled with the mobile device management system based on determining that the first request to access the first resource does not include the address of the predetermined proxy server;
   preventing, based on determining that the client device is not enrolled with the mobile device management system, the client device access to the first network resource;
   providing to the client device, based on determining that the client device is not enrolled with the mobile device management system, a redirect to a mobile device management resource that is different from the first network resource;
   providing instructions for presentation of a user interface to the client device, the provided instructions relating to the mobile device management resource and comprising a user notification regarding a mobile device management profile;
   enrolling the client device with the mobile device management system, the enrolling comprising providing a copy of the mobile device management profile to the client device;
   receiving a second request for access to a second network resource from the client device, the second network resource corresponding to one of the plurality of restricted resources;
   allowing the client device access to the second network resource based on determining that the client device is enrolled with the mobile device management system;
   determining whether the mobile device management profile has been deactivated on the client device; and
   un-enrolling the client device from the mobile device management system based on determining that the mobile device management profile has been deactivated on the client device, the un-enrolling preventing the client device from accessing the plurality of restricted resources.

20. The system of claim 19, wherein the second request is received prior to the first request and the second network resource corresponds to one of a plurality of unrestricted resources accessible by devices not enrolled with the mobile device management system; the method further comprising:
   allowing the client device access to the second network resource.

21. The system of claim 19, wherein the plurality of restricted resources comprises resources managed by an organization that uses the mobile device management system.

22. The system of claim 19, wherein the plurality of restricted resources comprises public network resources.

23. The system of claim 19, wherein determining that the client device is not enrolled with the mobile device management system comprises:
   determining whether a heartbeat signal has been received within a predetermined period of time; and determining that the client device is not enrolled with the mobile device management system based on determining that the heartbeat signal has not been received within the predetermined period of time.

24. The system of claim 19, wherein determining that the client device is not enrolled with the mobile device management system comprises:
- determining whether the client device is connected to a non-compliant network, the non-compliant network providing access to the plurality of unrestricted resources and not providing access to any of the plurality of restricted resources; and
- determining that the client device is not enrolled with the mobile device management system based on determining that the client device is connected to a non-compliant network.

25. The system of claim 19, wherein determining that the client device is not enrolled with the mobile device management system comprises:
- determining whether a device identifier associated with the client device is categorized as being enrolled with the mobile device management system; and
- determining that the client device is not enrolled with the mobile device management system based on determining that the device identifier associated with the client device is not categorized as being enrolled with the mobile device management system.

26. The system of claim 19, wherein:
the instructions comprise instructions for presentation of an agreement to enroll the client device with the mobile device management system; and
enrolling the client device with the mobile device management system comprises receiving input from the client device indicating acceptance of the agreement, wherein the client device is enrolled with the mobile device management system in response to receiving the input from the client device.

27. The system of claim 19, wherein determining whether the mobile device management profile has been deactivated on the client device comprises determining whether the mobile device management profile has been removed from the client device.

* * * * *

UNITED STATES PATENT AND TRADEMARK OFFICE
CERTIFICATE OF CORRECTION

| | | |
|---|---|---|
| PATENT NO. | : 8,910,263 B1 | Page 1 of 1 |
| APPLICATION NO. | : 14/029639 | |
| DATED | : December 9, 2014 | |
| INVENTOR(S) | : Paul Michael Martini | |

It is certified that error appears in the above-identified patent and that said Letters Patent is hereby corrected as shown below:

On the Title Page:

Item (56) in Other Publications, column 2, line 1, delete "corn" and insert -- com --, therefor.

In the Claims:

Column 17, line 11, in Claim 1, delete "resource;" and insert -- resources; --, therefor.

Signed and Sealed this
Thirty-first Day of March, 2015

Michelle K. Lee
*Director of the United States Patent and Trademark Office*